G. T. VEEDER.
ANT TRAP.
APPLICATION FILED SEPT. 22, 1915.
1,179,687.
Patented Apr. 18, 1916.
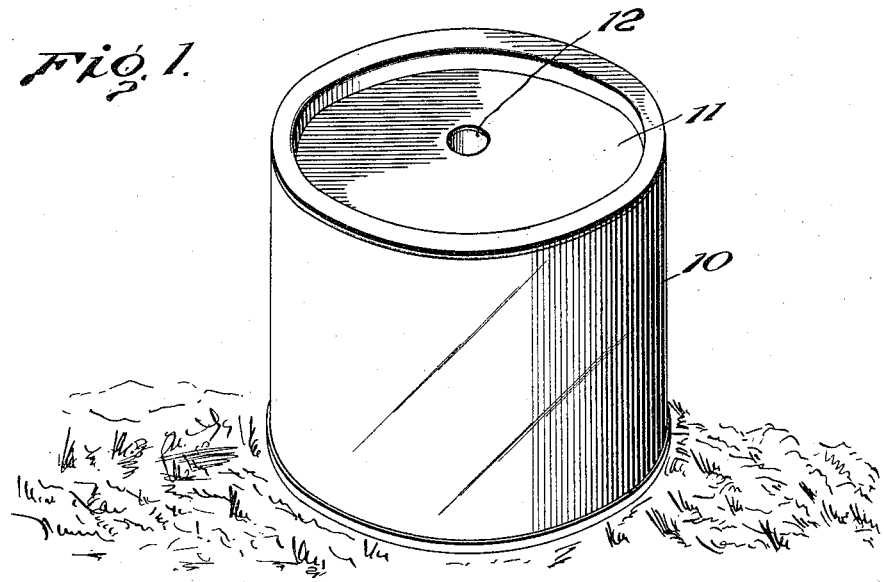
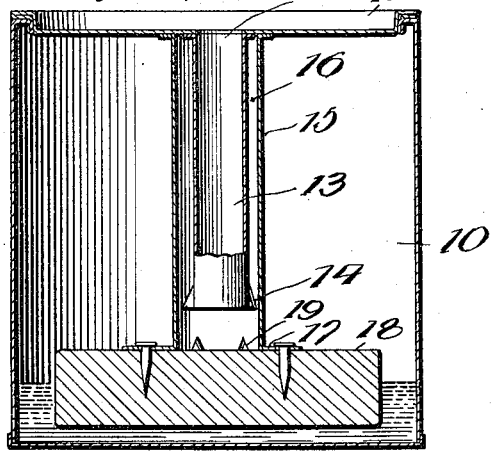
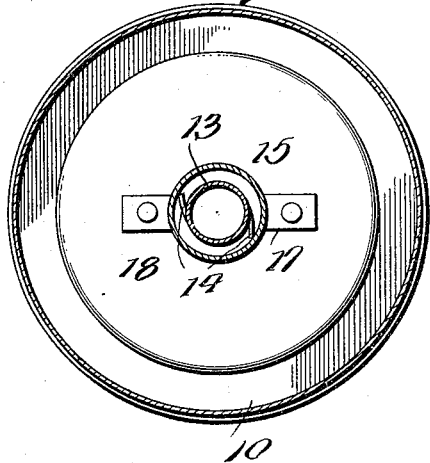
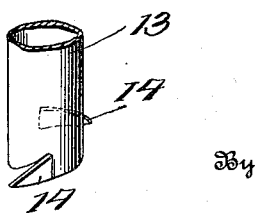
Inventor
G. T. Veeder

UNITED STATES PATENT OFFICE.

GEORGE THOMAS VEEDER, OF CHARENTON, LOUISIANA.

ANT-TRAP.

1,179,687.

Specification of Letters Patent. Patented Apr. 18, 1916.

Application filed September 22, 1915. Serial No. 51,951.

*To all whom it may concern:*

Be it known that I, GEORGE T. VEEDER, a citizen of the United States, residing at Charenton, in the parish of St. Mary and State of Louisiana, have invented certain new and useful Improvements in Ant-Traps, of which the following is a specification.

This invention contemplates an improved ant trap and has as its primary object to provide a device of this character adapted to contain a liquid poison and so constructed that the poison cannot spill out, should the trap become overturned.

The invention has as a further object to provide a device of this character wherein ants entering the trap may find easy access to the poison, but wherein the egress of the ants from the trap can be accomplished only with difficulty. And the invention has as a still further object to provide a trap which will be simple in construction and wherein, if desired, the major portion thereof may be formed from sheet metal.

With these and other objects in view, my invention will be more fully described, illustrated in the accompanying drawings and then specifically pointed out in the claims which are attached to and form a part of this application.

In the drawings, Figure 1 is a perspective view of my improved trap, Fig. 2 is a vertical sectional view and more particularly showing the internal construction of the trap, Fig. 3 is a horizontal sectional view showing the arrangement of the ears carried by the inlet tube of the trap, and Fig. 4 is a fragmentary perspective view of the inner end of the said inlet tube.

Corresponding and like parts are referred to in the following description and indicated in all the views of the drawings by the same reference characters.

In carrying out my invention, I preferably employ a cylindrical casing or receptacle 10 which may be formed of sheet metal or any other suitable material and may, of course, be constructed any desired size. Detachably fitting in the open end of the receptacle is a closure 11 which is provided centrally with an opening 12.

Mounted upon the closure 11 and surrounding the opening 12 therein, is an inlet tube or member 13 which provides a passage from the exterior of the casing and is secured at one end to the closure in any suitable manner. The inlet tube 13 is arranged to extend axially within the receptacle and at its lower extremity is provided with diametrically disposed wings 14 arranged to extend tangentially to the wall of said tube. The wings 14 are more particularly shown in Fig. 4 of the drawings and it will be observed that the wall of the tube is notched upon opposite sides thereof to define the wings XX, and the said wings are then bent outwardly in opposite directions as therein illustrated.

Arranged to surround the inlet tube in spaced relation thereto is a cylindrical jacket 15 secured at one end to the closure 11 and extending at its opposite end beyond the inner extremity of the said tube. It will be noted that the inlet tube 13 is arranged axially within the casing 15 and defines in connection therewith a chamber 16 sealed at its outer end by the closure 11. The jacket 15 at the inner open end thereof is provided with oppositely disposed ears 17 which extend radially therefrom and support a block 18 connected to the ears by tacks or other suitable fastening devices. The block 18 may, if desired, be formed of wood, and it will be noted that the inner end of the jacket is arranged to abut the block which consequently closes the jacket at its inner extremity. Formed in the wall of the jacket at the inner end thereof is a series of circumferentially spaced notches 19, establishing communication between the jacket and the interior of the receptable 10.

The receptacle 10 is designed to contain a poisonous liquid as shown in Fig. 2 of the drawings and it will be noted that ants may enter through the tube 13. Particular attention is now directed to the fact that the wings 14 are arranged to abut the wall of the jacket 15 to provide indirect communication between the inlet passage and the element 18 so that the ants so entering the tube 13 may cross upon the said wings from the inlet tube to the wall of the jacket, and having gained the wall of the jacket, the ants may then enter upon the block 18 through the openings 19 in the jacket to find easy access to the poison, the block providing a landing for the ants at the inner end of the jacket. It will thus be noted that while ants may readily enter the trap, their egress therefrom may be accomplished only with difficulty and it is to be noted, that if desired, the major portion of the trap may be formed from sheet metal. Should the receptacle 10 become overturned, the poison therein would be prevented from escaping through the opening 12 by the presence of the chamber 16, so that in use, the device will prove a very effective and desirable article.

Having thus described my invention, what I claim and desire to secure by Letters Patent is:

1. A device of the character described including a casing provided with an inlet tube, a jacket surrounding said tube and defining an intermediate chamber closed at its inner end, a wing carried by the said tube and extending toward the wall of the jacket, and an element carried by the jacket and providing a landing at the inner extremity thereof.

2. A device of the character described including a casing, a closure fitted thereon and provided with an opening, an inlet tube extending into the casing and surrounding said opening, a jacket surrounding the said tube in spaced relation thereto and defining in connection therewith an intermediate chamber sealed at one end by the said closure, a wing carried by the inlet tube and projecting toward the wall of the jacket, and an element carried by the jacket and providing a landing at the inner extremity thereof.

3. A device of the character described including a casing provided with an opening, an inlet tube surrounding said opening, a jacket surrounding the inlet tube and having its wall provided with a notch at the inner end of the said jacket, a wing carried by the tube and projecting toward the wall of the jacket, and an element carried by the jacket and providing a landing accessible through the said notch.

4. A device of the character described including a casing, a member projecting into the casing and providing an inlet passage, a wing carried by the said member, a jacket surrounding said member with the wing extending toward the wall of the jacket, and an element carried by the jacket and providing a landing at the inner extremity thereof.

5. A device of the character described including a casing, a member projecting into the casing and providing an inlet passage, a jacket surrounding said member, an element connected to said jacket and providing a landing at the inner end of the jacket, and means carried by the inlet tube and projecting toward the wall of the jacket.

6. A device of the character described including a receptacle open at one end, a closure fitted in the open end of the receptacle and provided with an opening, an inlet tube terminally secured to the closure and surrounding the said opening, a jacket terminally secured to the closure and surrounding the inlet tube in spaced relation thereto, a wing struck from the inner end of the inlet tube and projecting toward the wall of the jacket, there being a notch formed in the wall of the jacket at its inner end, ears carried by the inner end of the jacket, and a block connected to said ears and the inner end of the jacket with the said notch establishing communication between the jacket and the interior of the receptacle.

7. A device of the character described including a casing provided with an inlet passage from the exterior of the casing, a member providing a passage communicating with the inlet passage and closed with respect to the exterior of the casing, and an element supported within the casing by said member to provide a landing leading from said second mentioned passage.

8. A device of the character described including a casing, a member projecting within the casing and providing an inlet passage from the exterior of the casing, an element arranged within the casing and providing a landing, means supporting said element and surrounding said member, and means supported to extend between the member and said first mentioned means to provide communication between the passage and said landing.

9. A device of the character described including a casing, a member projecting into the casing and providing an inlet passage arranged within the casing to provide a landing, means supporting the said member in position and surrounding said member, and a lug supported to extend between the member and said means to provide communication between the passage and said landing.

10. A device of the character described including a casing, a closure therefor, a member supported by said closure to project into the casing and providing an inlet passage, a second member surrounding said first mentioned member and carried by the closure, and an element carried by said second mentioned member and providing a landing within the casing having communication with said inlet passage, the said members and said element being removable from the casing with the closure.

In testimony whereof I affix my signature.

GEO. THOMAS VEEDER. [L. S.]

Copies of this patent may be obtained for five cents each, by addressing the "Commissioner of Patents, Washington, D. C."